US009396230B2

(12) United States Patent  
Ryder

(10) Patent No.: US 9,396,230 B2  
(45) Date of Patent: Jul. 19, 2016

(54) SEARCHING AND CONTENT DELIVERY SYSTEM

(71) Applicant: Rory Ryder, Worcestershire (GB)

(72) Inventor: Rory Ryder, Worcestershire (GB)

( * ) Notice: Subject to any disclaimer, the term of this patent is extended or adjusted under 35 U.S.C. 154(b) by 189 days.

(21) Appl. No.: 14/325,109

(22) Filed: Jul. 7, 2014

(65) Prior Publication Data

US 2015/0206525 A1 Jul. 23, 2015

(30) Foreign Application Priority Data

Jan. 22, 2014 (GB) .................................. 1401046.6

(51) Int. Cl.
| G06F 17/20 | (2006.01) |
| G10L 15/00 | (2013.01) |
| G10L 13/00 | (2006.01) |
| G10L 25/00 | (2013.01) |
| G01L 21/00 | (2006.01) |
| G06F 17/30 | (2006.01) |

(52) U.S. Cl.
CPC .... G06F 17/30424 (2013.01); G06F 17/30991 (2013.01)

(58) Field of Classification Search
USPC ........... 704/8, 9, 10, 235, 246, 249, 251, 257, 704/254, 258, 260, 261, 267, 268, 266, 278, 704/270, 270.1, 275
See application file for complete search history.

(56) References Cited

U.S. PATENT DOCUMENTS

| 5,880,731 A * | 3/1999 | Liles ................... H04L 12/1827 345/473 |
| 7,203,759 B1 * | 4/2007 | Ostermann ......... H04L 12/5835 704/246 |
| 7,472,166 B1 * | 12/2008 | Davis .................... G06F 9/4446 709/217 |
| 2001/0019330 A1 * | 9/2001 | Bickmore ............... G06T 13/40 345/473 |
| 2001/0050689 A1 * | 12/2001 | Park ........................ G06T 11/00 345/629 |
| 2002/0194006 A1 * | 12/2002 | Challapali ............... G06T 13/40 704/276 |
| 2003/0046160 A1 * | 3/2003 | Paz-Pujalt ............ G06Q 10/107 705/14.69 |
| 2004/0172254 A1 * | 9/2004 | Sharma .................. A61K 8/411 704/270.1 |
| 2008/0255841 A1 * | 10/2008 | Hanazawa ............ G10L 15/197 704/246 |
| 2012/0271640 A1 * | 10/2012 | Basir ................. H04M 1/72552 704/275 |

OTHER PUBLICATIONS

Badino et al., ("Approach to TTS Reading of Mixed-Language Texts", Proc. of 5th ISCA Tutorial and Research Workshop on Speech Synthesis, Pittsburg, PA, 2004).*

* cited by examiner

Primary Examiner — Edgar Guerra-Erazo

(57) ABSTRACT

A method of providing access to/delivering textual content on the internet or data bases, the method comprising the steps of inputting at a user device, a search query or request for a webpage or data base results, identifying the content to be delivered to the user; identifying one or more web pages or off line data base corresponding to the query/request; parsing a first identified web page or data base result to extract textual content from the first web page or data base; inputting some or all of the extracted textual content to a text-to-speech synthesiser to generate an audio output; further inputting some or all of extracted textual content to an animation unit configured to synchronise the generated audio output with one or more predetermined animation sequences to provide the visual output of an animated figure delivering the audio output; displaying, at the user device the visual output of the animated figure reading the extracted textual content.

20 Claims, 5 Drawing Sheets

SEARCHING AND CONTENT DELIVERY SYSTEM

TECHNICAL FIELD OF INVENTION

The present invention relates to an apparatus and methodology for providing access to content, the content may be held on the internet or a local content store such as a database or server.

BACKGROUND TO THE INVENTION

As more information is made available to users over the internet the ability of a user to search and consume content has changed.

It is known to search for content, though the information presented may not be suitable for a user nor is it necessarily presented in an easy to understand manner. Many internet users are children who are unable, or having difficulty in reading and typing. Similarly, some internet users are visually impaired and cannot view a screen or display for an extended period of time.

It is known to use a text-to-speech systems to read text stored on the internet. However, such systems require the user to input the text manually and typically require long complicated key strokes or sequences to achieve the desired result.

There is a need to provide a more efficient man-machine interface which allows users to access and be presented with content in an effective, simple to use, manner.

According to an aspect of the invention there is provided a method of providing access to/delivering textual content on the internet, the method comprising the steps of: inputting at a user device, a search query or request for a webpage, identifying the content to be delivered to the user; identifying one or more web pages corresponding to the query/request; parsing a first identified web page to extract textual content from the first web page; inputting some or all of the extracted textual content to a text-to-speech synthesiser to generate an audio output; further inputting some or all of extracted textual content to an animation unit configured to synchronise the generated audio output with one or more predetermined animation sequences to provide the visual output of an animated figure delivering the audio output; displaying, at the user device the visual output of the animated figure reading the extracted textual content.

Other aspects of the invention will become apparent from the appended claim set.

BRIEF DESCRIPTION OF THE FIGURES

Embodiments of the invention are now described, by way of example only, with reference to the accompanying drawings in which.

DESCRIPTION OF AN EMBODIMENT OF THE INVENTION

There is provided a content delivery system in the form of a personal assistant, which is able to assimilate a search query from a user, identify the most relevant result and delivery the result to the end user via an audio output via an animated figure. The animations are synchronised with the audio output in order to provide the end user with the visual effect that the animated figure is delivering/speaking the results of the search query. Optionally, in order to aide with learning and to improve the end user's interaction with the animated figure the text of the search query is synchronously presented as the animated figure "speaks" the text. In a preferred embodiment of the invention the animated figure is a robot which is reading a book. As the text is spoken the robot is animated so as to present the illusion that the robot is reading the text from the book. The movement of the robot, eyes, mouth, facial expressions etc., are synchronised with the audio output so as to create an interactive experience for the end user. It is found that such an experience, a kinaesthetic experience, aides a user's understanding of the information presented therefore providing a more efficient interface for the user to assimilate the information.

The present invention may be used to search online content (e.g. webpages) or locally held content on computers, databases, servers etc. The invention, in some embodiments allows the user to use the results of the search and integrate the results with other functionality present in a user's device. For example when the invention is executed on a smartphone, tablet computer, desktop computer, laptop or wearable device if a search query contains contact information, such as a telephone number or VOIP address, the invention identifies the contact information and initiates contact. In an embodiment the invention launches a VOIP program, such as Skype, to initiate a call. In further embodiments where the search query returns an address the invention opens u$_p$ a web mapping service application or program, and uses the information to display the location. Preferably, the invention also interacts with the web mapping service and known location determining means (such as GPS) which are present, in say a wearable smart device, smartphone, tablet computer etc., to provide direction information.

Therefore the present invention provides the user with an interactive experience through which they can access content, held on a number of sources such as the interne. Advantageously, such a system may be used by the visual impaired and/or those who cannot, or have difficulty, in reading or writing. Furthermore, by having the animated figure delivering the results of the search query the end user's experience is improved as they can further engage with the animated figure. Such interaction may be particularly beneficial for young children.

Figure 1:
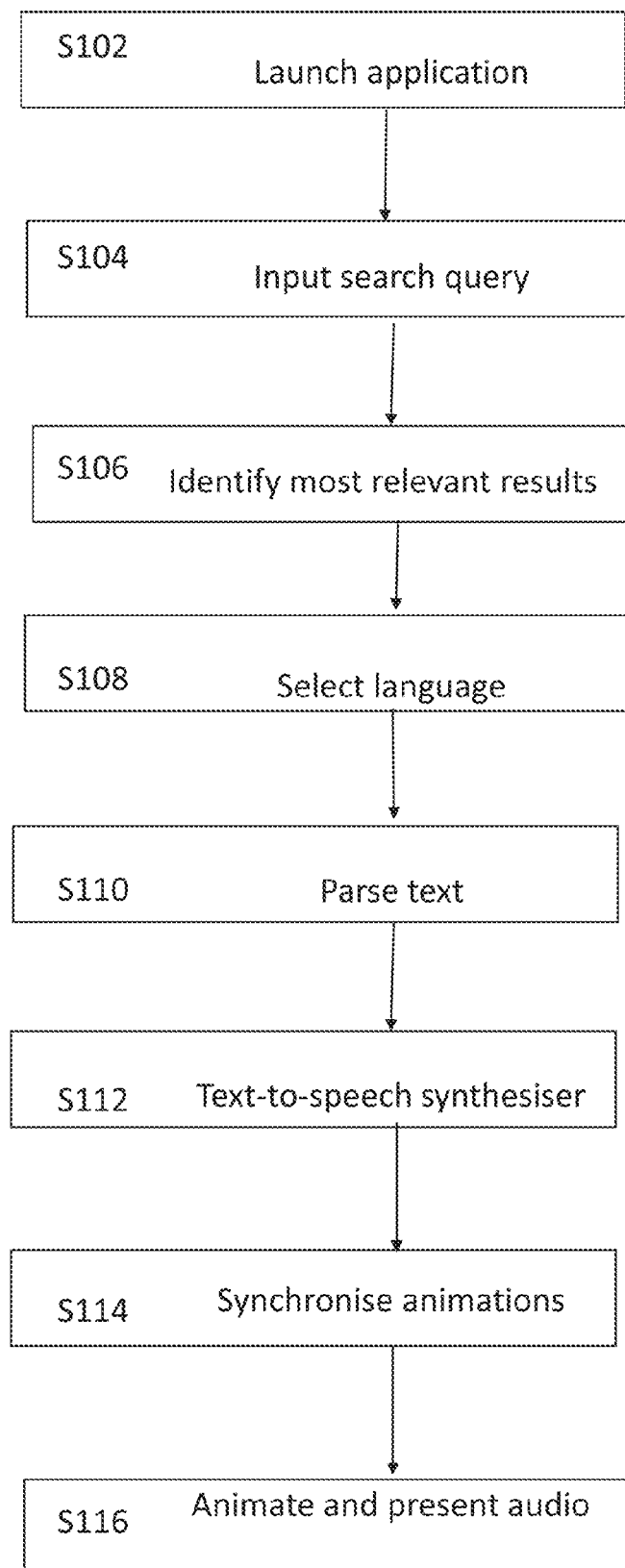
FIG. 1 is a flow chart of the process according to an aspect of the invention.

FIG. 1 is a flowchart describing the process of an end user utilising the content delivery system of the present invention.

At step S102, the end user commences their use of the invention as they launch an application, or computer program with which they may input a search query to retrieve content from the Internet, which is subsequently presented to the user in an efficient, interactive, manner. For ease of illustration, the following process is described with respect to a smartphone or tablet computer device, though the invention described herein may equally be applicable to other computing devices such as desktop computers, laptops etc.

The launching of the application is done in a known manner, such as a tap gesture on a touch sensitive display, double clicking an icon, voice command etc. Upon launching of the application the user is presented with a welcome, or splash screen. An example of such a screen is described below with reference to FIG. 2.

As step S104, the user inputs a search query. The search query may be inputted using as a text input, using known text input means such as a keyboard, or alternatively may be inputted as a voice input. The search query is indicative of the information that the user wishes to be presented with. In the example shown below, with reference to FIG. 2, the search query is inputted as a text query relating to "London".

In an embodiment of the invention, the search query is used to search the Wikipedia website. In further examples of the invention, the search query may search any other content database held locally or online (for example, a database of legal texts, song lyrics, other encyclopaedias, dictionaries etc., or it may provide links to a series of webpages as is known with known search engines).

At step S106, the most relevant search results relating to the search query inputted as step S104 are identified and presented to the user. In a further example of the invention, the most relevant search result is automatically identified (for example, using known page ranking systems) and is presented to the user.

An important aspect of the invention is the ability to aid the end user's comprehension of the presented information whilst also enabling them to learn in a more interactive manner. As it is known in online databases, such as Wikipedia, to have articles in multiple languages, at step S108 the user may be provided with the option to select the language they wish for the results of the search query to be presented. The language options relate to the languages in which the results of the search query are written.

The user then interacts with their end user device in order to select the most appropriate language. The list of available languages is presented to the user in a drop down list allowing the user to select the language of choice. Once such a selection has been made, the relevant web page is retrieved.

Alternatively, the end user may choose to only have the results presented in a single language (e.g. English) and accordingly the end user is not presented with an option to select a language at step S108.

As the information is retrieved from the Internet, the content is stored in the form of HTML documents or the like. Such documents are known to contain a mixture of textual content (e.g. the words of an article) relating to the results of the search query as well as a mark up language which is used by a web browser to properly render the content on the end user device. Such mark up content is therefore not relevant to the search query. It is also known that content stored on the Internet may comprise of multi-media content such as images, videos etc. Such content is relevant to the end user when viewing the web page on a display however such content is of little relevance when the content of the web pages is outputted in audio format.

Accordingly, at step S110 the web page which is identified as being the most relevant web page (as a result of the inputted search query), is parsed in order to extract the relevant textual content. Accordingly, content relating to the mark-up language in which the web page is stored, and content such as multi-media content, is ignored. Preferably, content relating to advertising, copyright notices, navigation bars or systems etc., are also ignored at this stage.

At step S110 a number of further rules may also be used in order to optimally identify the most relevant information. For example, paragraph headings, numbering, footnotes etc. may also be ignored.

In further embodiments, information within the parsed text may also be ranked so as determine the most relevant content within the parsed text. For example, it is known in encyclopaedias, such as Wikipedia, to provide a "summary" section of an article before providing an in-depth review of the subject in question. Accordingly, depending on user preference, it may be that the end user simply wishes to receive the summary, or overview, of the content before deciding whether to listen to the full text of the page.

At step S112, some or all of the parsed text is sent to a text-to-speech synthesiser in order to generate an audio output of the parsed text. Such text-to-speech synthesiser are known in the art.

At step S114 the text which was sent to text-to-speech synthesiser at step S112 is analysed by an animation synchronisation module. In order to provide an improved end user experience, it is desirable that the animated figure presenting the speech output of the search query is animated in such a manner that the motion of the figure is synchronous with the text in order to provide the impression that the text is being spoken by the animated figure. Therefore, it is desirable that the animations relating to the movement of the mouth of the animated figure of synchronous with the spoken text. In further examples the animated figure may be animated so as to provide the impression that the figure is reading the text from a textbook, or the like, accordingly the movement of the eyes of the animated figure are also consistent with the eye movement of the figure reading the text.

Additionally, the text of the output may also be presented on a screen at the same time as the audio output, in a manner similar to subtitles, and the animation synchronisation unit ensures that the text presented on the screen is the same as the text which is currently being read out by the animated figure.

To ensure the animations remain consistent the language structure of the text (number of words, syllables, punctuation etc.) submitted to the animation synchronisation unit is used to determine an optimal animation sequence for the text. For example, a specific sequences of syllables may be associated with a set animation sequence of the figure's mouth.

At step S116 the animated figure is synchronised with the audio output from the text to speech synthesiser and provides the end user with a visual and audio output of the results of the search query.

In an example of the invention, the results from the search query are extracted from the Wikipedia website, and the animated figure is an animatronic robot which has a moving mouth and eyes in order to replicate the impression of the robot reading from a book and speaking aloud the results of the search query.

In further embodiments the end user device, comprises or is connected to an offline database. The search query is inputted to the database and the relevant results are extracted from the database. The information is presented on the end user's device as described above with references to steps S110 to S116.

Optionally at step S118 the invention presents the user the ability to integrate the results of the search query with existing applications or programs which are present on the machine upon which the invention is performed. For example if the user has inputted a search query regarding cinema times, information regarding the cinema (location and telephone) are typically present in the relevant results. At step S118 the user is presented with the option of using the results. In an embodiment the invention is performed on a smartphone which has functionality such as a web mapping service and the search results are analysed for location information (such as the address of the cinema). The user is presented with the option at step S118 to use such information, in an embodiment if the user agrees to interact with the information the identified is automatically inputted into the web mapping service. Similarly contact information (such as a telephone number) is automatically dialled on the phone or on a VOIP program. Similarly an email address identified in the search results in the launching of an email client with the address inserted.

Therefore, the user has the ability to further interact with the information presented.

Advantageously, therefore the present invention provides an improved methodology with which to present information to the end user. The information presented, in an embodiment, is the most relevant information for the user, who has selected the search query result to be presented. Furthermore, the user has the ability to have the results spoken in one of a multiple languages. Optionally, the text of the spoken results is scrolled on the screen synchronously with the spoken output. Optionally, the audio output (i.e. the spoken text) and the scrolled text may be in the same or different languages. In examples where the text and spoken output are in the same language this aides the end user's comprehension of the text as well as helping them learn the correct spelling and pronunciation of words. Where the text and audio output are different languages the end user is able to use the different outputs to learn new vocabulary as well as confirm their understanding of the output. Preferably, there is a simple toggle option presented to the user to turn the subtitles on or off, thereby allowing the delivery of the results to continue without interruption.

Advantageously, the animated figure may also be paused whilst reading the results. Preferably, to increase the end user's interaction with the figure the figure is animated to indicate a pause or sleeping state. Similarly, when the process is resumed the figure is animated to provide the end user with the impression that the figure has been awoken. Such animations provide an improved user interactions and an improved end user experience.

The inputting of the search queries, and presentation of the results in such a kinaesthetic manner beneficially enables a faster assimilation of the information presented.

In further examples the user is able to input a webpage address, or block of text, in order for the text to be rendered using the text-to-speech synthesiser and synchronised animations.

Therefore, the present invention provides the end user with an easy to access information which may be held online (for example Wikipedia) or locally stored, for example on a database, local server, intranet, on a computer etc. By allowing the search to be inputted and presented to the end user in such a manner the user's ability to assimilate the information is improved thus providing a more efficient man-machine interface.

FIG. 2 is an example of the invention in use.

Figure 2A:
FIG. 2*a* shows an example of a typical launch screen, or splash page, presented to the user when launching the application.

FIG. 2a shows an example of a typical launch screen, or splash page, presented to the user when launching the application, as per step S102.

There is shown in FIG. 2a the animated FIG. 10, search query input 12, a widget to share the results 14, settings 16, and speech bubble 18 to represent the audio output.

In a preferred embodiment the animated FIG. 10 is a robot with humanoid features, such as eyes and a mouth. The robot 10 also reads a book, thereby creating the impression to the end user that the robot has looked up in the answer of the query from a textbook, and is reading the result from the textbook.

Figure 2B:
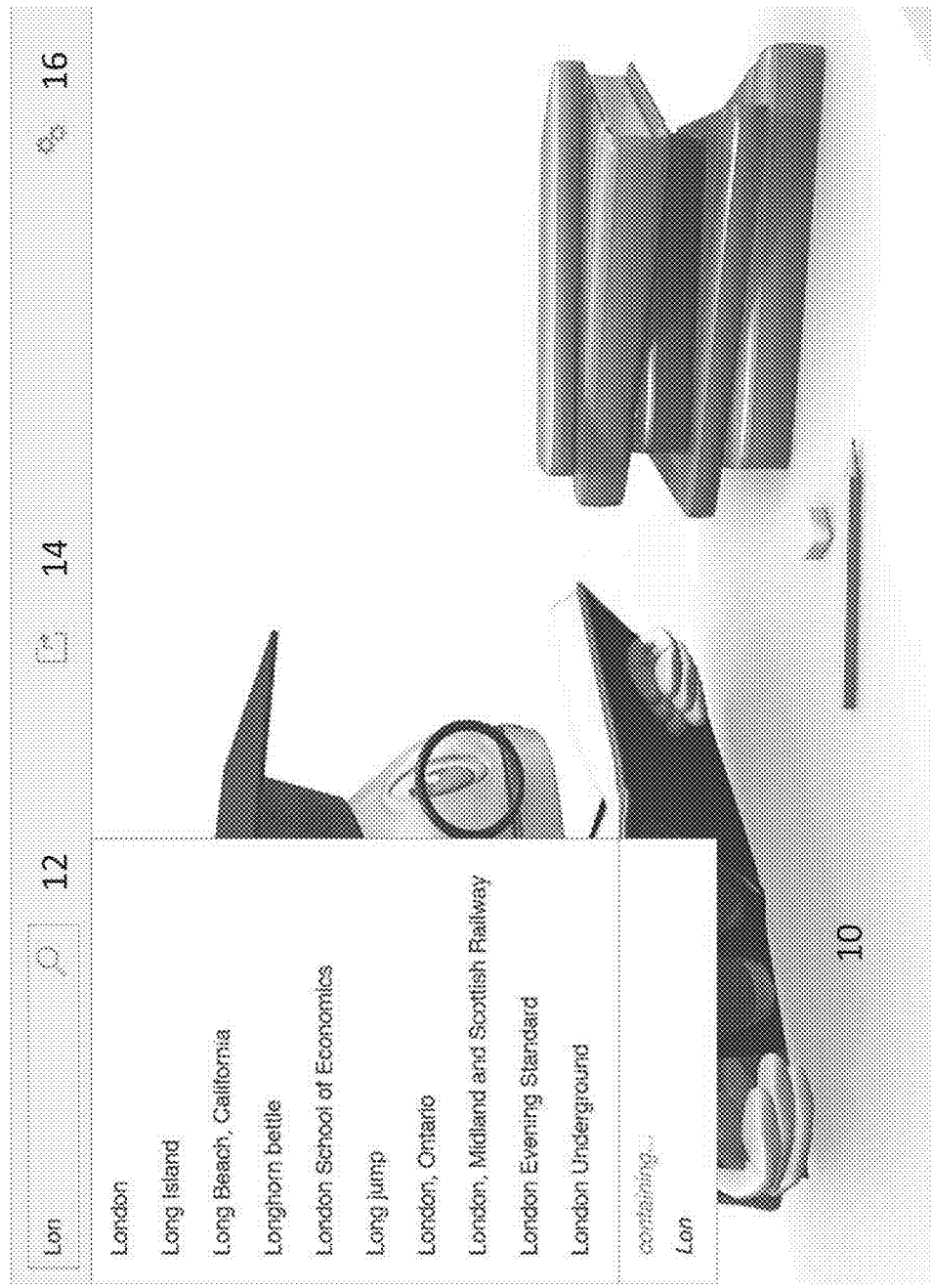
FIG. 2*b* shows a screenshot of a user inputting a search query.

FIG. 2b shows a screenshot of a user inputting a search query as per step S104. The search query is inputted into the search query tool bar 12. The search query in this instance is a text input via a keypad, or keyboard (not shown) though in further embodiments, voice queries may be used. Preferably the search query has a known autocomplete functionality. In the example shown in FIG. 2b the user has typed in the characters "Lon" and is subsequently presented with a number of potential options for the completed search query.

Figure 2C:
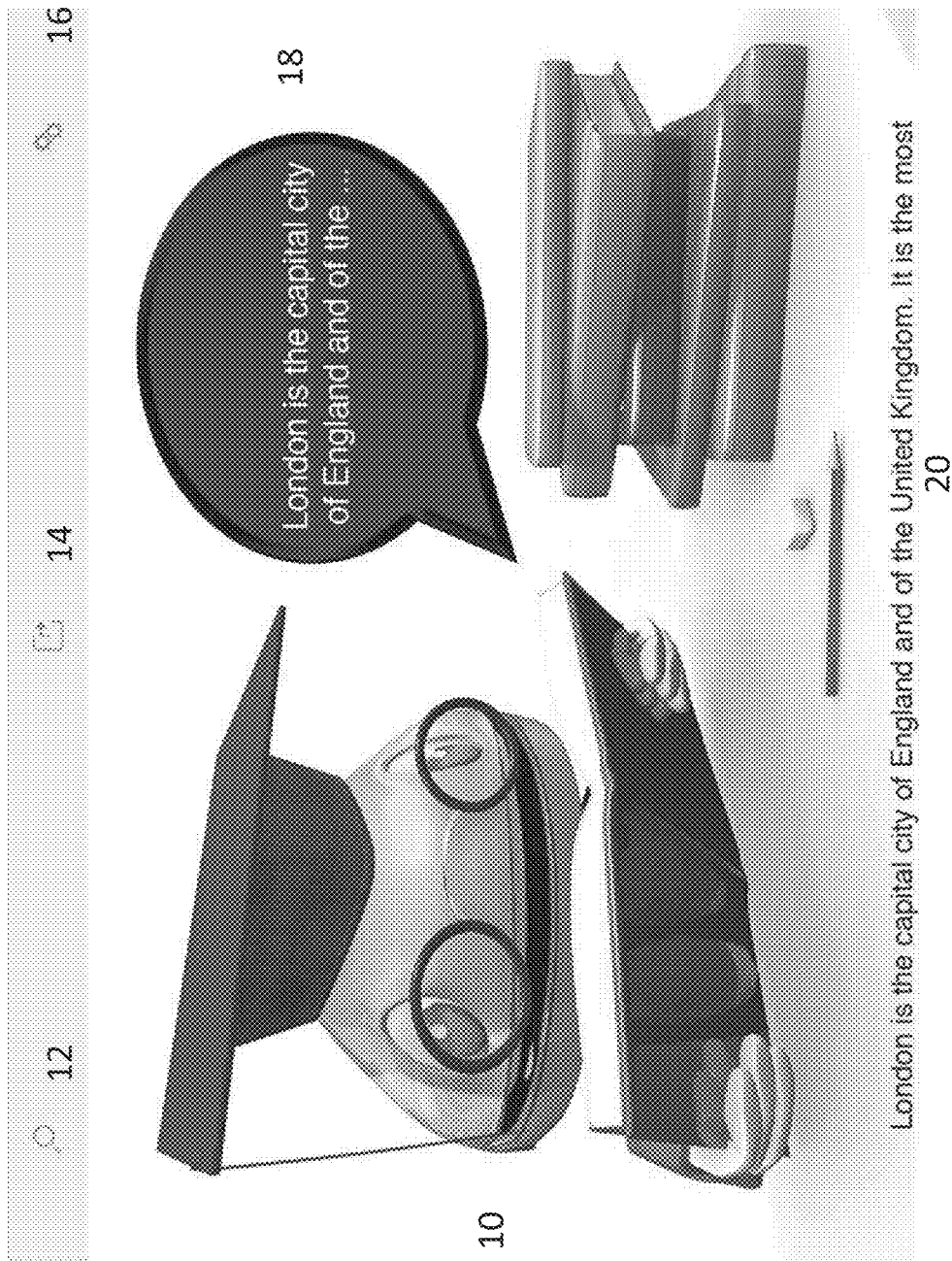
FIG. 2*c* shows an example of the animated robot delivering the results of the query.

FIG. 2c shows an example of the animated robot delivering the results of the query audibly (via speech bubble 18) and as a rolling text output or subtitles 20. As can be seen in FIG. 2c the search query "Lon" as shown in FIG. 2b has been completed to "London" and the robot, via the text-to-speech synthesiser is audibly delivering the results of the search query of the query "London".

The robot's eyes and mouth are animated during the audio delivery to provide the impression that the robot is reading the text from the textbook and reading the information out loud. In use if the user interacts with the animated FIG. 10, for example via tap gesture or mouse click depending on the end user's device, the animated FIG. 10 will pause. Preferably, the animated FIG. 10 is animated to indicate that it has paused, thus improving the interactive element of the invention.

Figure 2D:
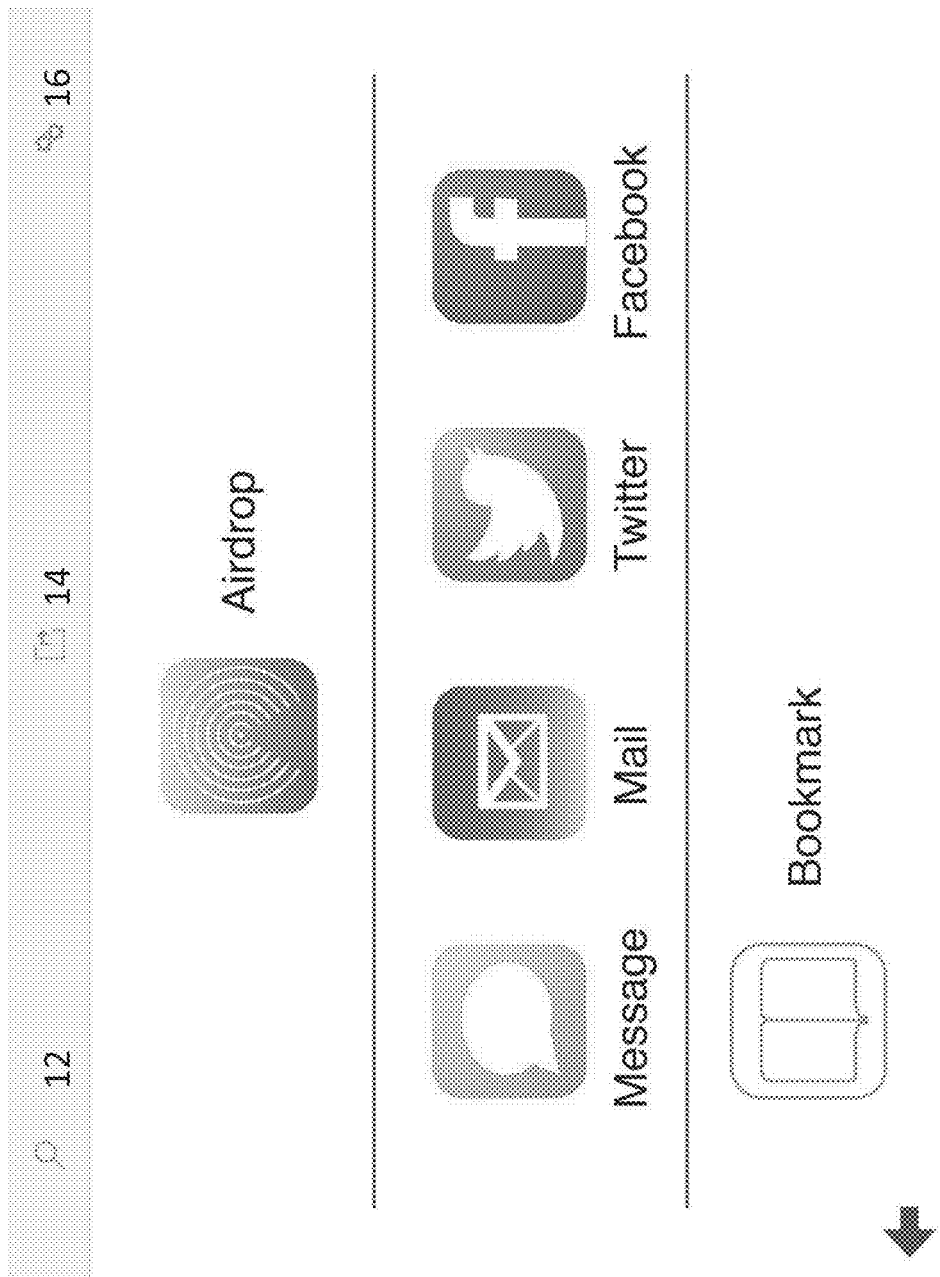
FIG. 2*d* shows an example of the options available to the end user in the sharing widget.

FIG. 2d shows the options available to the end user in the sharing widget. The end user is presented with options to share or "post" a link to the animated figure reading on a social media website. Alternatively they may send a link to the animated search via email.

A further aspect of the invention is to allow the user to select one of several languages to search, and/or for the results to be delivered. The languages may be selected via drop down menu, text input, radio buttons etc. The information is used by the system to deliver the results in the appropriate language. When a different language is selected, preferably the appropriate text-to-speech synthesiser is selected, so as to ensure optimal audio. Similarly, the rules used to synchronise the animations with audio by the animation unit may also change according to the language selected so as to optimally synchronise the animated figures motions with the text.

Therefore the present invention provides an improved end user experience in which they can interact with the animated figure in a fun and effective manner. The mixture of audio and visual output also helps the end user with comprehension of the text, aide in learning a new language, as well as be fully accessible to young, the hard of seeing or hearing, and those with difficulty with reading and/or writing. It is beneficially found that the use of the animated figure also improves user interactivity providing a more personal experience for the user, ultimately aiding their comprehension of the information presented.

The invention takes the form of a software module, or app, which is installed onto a computing device. The device has a processor for executing the invention, with a display and a user input. The computing device may be one of a smartphone, tablet computer, laptop, desktop or wearable computer such as a smart watch device, or a device with an optical head-mounted display. Such devices contain the display and user input which the invention utilises as well as having other existing functionality with which the invention may interact (as per step S118 of FIG. 1). Such functionality includes the ability to make telephone calls (such as via VOIP or a mobile telephone network), email clients, mapping services etc.

The invention claimed is:

1. A method of providing access to/delivering textual content, the method comprising the steps of:
inputting at a user device, a search query or request for a resource identifying the content to be delivered to the user;
identifying one or more web pages/data entry corresponding to the query/request;
parsing a first identified web page/data entry to extract textual content from the first web page/data entry;

inputting some or all of the extracted textual content to a text-to-speech synthesiser to generate an audio output;

further inputting some or all of extracted textual content to an animation unit configured to synchronise the generated audio output with one or more predetermined animation sequences to provide the visual output of an animated figure delivering the audio output;

displaying, at the user device the visual output of the animated figure reading the extracted textual content.

2. The method of claim 1 further comprising the step of identifying a subset of content within the extracted textual content, the subset of content relating to the content most relevant to the search query.

3. The method of claim 1 further comprising the step of identifying one or more language rules within some or all of the extracted text and synchronising the audio output with the animation sequences according to the language rules.

4. The method of claim 1 wherein the set of parsing the web page involves identifying and discarding content identified as not relating to the search query.

5. The method of claim 4 wherein the content identified as not relating to the search query includes mark-up language, copyright notices, advertising and multimedia content.

6. The method of claim 1 wherein the end user is able to select a language in which the search results are delivered.

7. The method of claim 6 wherein the text-to-speech synthesiser is chosen to match the selected language.

8. The method of claim 1 wherein the animated figure is a robot.

9. The method of claim 8 wherein the robot is reading a book.

10. The method of claim 8 wherein the animation sequences include animating the eyes and mouth of the robot.

11. The method of claim 1 wherein the audio and visual output may be paused by the end user.

12. The method of claim 11 wherein an animation is shown to represent that the animated figure has entered a pause or sleep mode.

13. The method of claim 1 wherein the search query is inputted via text or speech.

14. The method of claim 1 wherein the user is able to select a search result from the one or more web pages related to the inputted search query.

15. The method of claim 1 wherein the search query returns results from an online resource, such as Wikipedia.

16. The method of claim 1 wherein the search query is performed on a local or offline data source.

17. The method of claim 1 Wherein the search results are parsed to identify contact information, and presenting on the display the option to use the contact information, wherein the contact information is a telephone number or VOIP ID, and the method comprises the steps of opening a communication application and calling the identified number or ID.

18. The method of claim 1 wherein the search results are parsed to identify location information, and presenting on the display the option to use the location information in a web mapping service application.

19. A computing device, having a processor, a display and a user input, wherein the processor is configured to perform the steps of:

receiving from the user input of the user device, a search query or request for a resource identifying the content to be delivered to the user;

identifying one or more web pages/data entry corresponding to the query/request;

parsing a first identified web page/data entry to extract textual content from the first web page/data entry;

inputting some or all of the extracted textual content to a text-to-speech synthesiser to generate an audio output;

further inputting some or all of extracted textual content to an animation unit configured to synchronise the generated audio output with one or more predetermined animation sequences to provide the visual output of an animated figure delivering the audio output;

causing the user device to display, at the display, the visual output of the animated figure reading the extracted textual content.

20. The computing device of claim 19 wherein the device is one of the group comprising: a smartphone, laptop computer, tablet computer, desktop computer or wearable computing device.

* * * * *